United States Patent [19]

Toga et al.

[11] 4,381,379

[45] Apr. 26, 1983

[54] POLYESTER CONTAINING 2-METHYL-1,3-PROPYLENE TEREPHTHALATE UNITS

[75] Inventors: Yuzo Toga; Toshio Shimada; Hajime Komada, all of Himeji, Japan

[73] Assignee: Daicel Chemical Industries, Ltd., Osaka, Japan

[21] Appl. No.: 360,493

[22] Filed: Mar. 22, 1982

[30] Foreign Application Priority Data

Mar. 25, 1981 [JP] Japan .................................. 56-44286
Apr. 15, 1981 [JP] Japan .................................. 56-56766

[51] Int. Cl.³ .................. C08F 283/00; C08F 283/02; C08G 63/76
[52] U.S. Cl. .................................... 525/444; 525/437; 525/445; 528/272; 528/303; 528/308.7

[58] Field of Search ...................... 525/437, 444, 445; 528/272, 309, 302

[56] References Cited

U.S. PATENT DOCUMENTS 4,025,492  5/1977  Binsack et al. ...................... 528/301
4,131,595  12/1978 Breitenfellner et al. ............ 525/444
4,322,333  3/1982  Kochanowski et al. ............ 525/444

Primary Examiner—Lucille M. Phynes
Attorney, Agent, or Firm—Flynn, Thiel, Boutell & Tanis

[57] ABSTRACT

Polytetramethyleneterephthalate is modified with incorporation of 2-methyl-1,3-propanediol. The diol component of the polyester comprises 1 to 99 mol % of tetramethylene glycol and 99 to 1 mol % of 2-methyl-1,3-propanediol. Alternatively polytetramethylene terephthalate is combined with 0.1 to 25 wt. %, based thereon, of poly-2-methyl-1,3-propylene terephthalate.

9 Claims, No Drawings

POLYESTER CONTAINING 2-METHYL-1,3-PROPYLENE TEREPHTHALATE UNITS

The present invention relates to a polyester resin which comprises as one component 2-methyl-1,3-propylene terephthalate units, in particular a polyester copolymer or polyester blend which comprises tetramethylene terephthalate units and 2-methyl-1,3-propylene terephthalate units. The polyester resin or blend according to the invention is obtained from (A) terephthalic acid, (B) 2-methyl-1,3-propanediol and (C) tetramethylene glycol. The polyester copolymer of the invention comprises monomer units (A), (B) and (C) as the essential components. The polyester blend of the invention comprises polyester of monomers (A) and (C) and another polyester of monomers (A) and (B), and/or a third polyester of monomers (A), (B) and (C). One purpose of the invention is modification of polytetramethylene terephthalate by means of incorporation of 2-methyl-1,3-propylene terephthalate units.

Many commercial polyester resins contain a glycol component such as ethylene glycol as in polyethylene terephthalate, and tetramethylene glycol as in polytetramethylene terephthalate. These glycols have two primary hydroxyl groups. This is due to the fact that primary hydroxyl groups are very reactive and easily to form ester bonds.

Polytetramethylene terephthalate (hereinafter referred to as "PBT") resin is a thermoplastic polyester resin having a high crystallizability, and it has a good compatibility with various fillers and additives. A reinforced PBT resin containing a glass fiber, mica, talc, flame retardant or the like incorporated therein shows excellent characteristics when it is used in various fields. Therefore, it is widely used to make electric and electronic parts, automobile parts and the like in various industries. More specifically, the PBT resin is excellent in the mechanical strength, durability, weatherability, chemical resistance, heat resistance, dimension stability and electric properties. Furthermore, the PBT resin has a higher crystallinity than that of a polyethylene terephthalate resin. Moreover, the PBT resin has a high crystallization speed and hence, the cooling solidification speed of the PBT resin is high. Still further, the PBT resin has a good flowability. Accordingly, the PBT resin is excellent in shapeability. The PBT resin having the above-mentioned excellent characteristics is an excellent engineering plastic material in which electric and mechanical characteristics are well-balanced with the processing characteristics.

However, the PBT resin has defects as described below.

(1) The PBT resin is naturally inferior in the dimension precision to amorphous and scarcely crystallizable plastics, and it is easily influenced by the mold temperature distribution. Moreover, the molding shrinkage depends greatly on the thickness of the molding, and because of this property and the deviation of the cooling speed, deformation or sinking is readily caused. In the PBT resin reinforced by a glass fiber or the like, this undesirable property promotes shrinkage anisotropy due to the orientation of the fiber, deformation is readily caused, and so-called warps are formed.

(2) PBT resin which is not specially reinforced is poor in flexibility and has a high notch sensitivity.

As means for moderating the foregoing defects, there is known a method in which the crystallizability is reduced by replacing a part of the terephthalic acid by an aliphatic dicarboxylic acid or blending another resin into the PBT resin to reduce deformation due to shrinkage at the molding step, and a method in which a filler having a lower anisotropy than the glass fiber, such as glass beads, talc or mica, is incorporated in the resin. However, no satisfactory resins can be obtained according to these methods.

The 2-methyl-1,3-propanediol used in this invention also has two primary hydroxyl groups, and has almost the same reactivity as tetramethylene glycol. When reacted together with ethylene glycol, tetramethylene glycol, etc. and with terephthalic acid, it yields easily a polyester copolymer containing 2-methyl-1,3-propylene terephthalate units at an arbitrary ratio.

The 2-methyl-1,3-propanediol is a structurally asymmetrical glycol along the main chain, having one methyl group as the side chain. Therefore, a polyester copolymer containing this diol as one component is irregular in structure and low in crystallinity. It is expected that this will lead to improvement of molding shrinkage and flexibility.

In the polyester resin according to the invention, said 2-methyl-1,3-propanediol units are contained in an amount of from 0.1 percent by weight, based on the whole weight of said polyester, to 99 mol percent, based on the total weight of the diol component.

The present invention relates preferably to a polyester copolymer which comprises terephthalic acid as the acid component and 1 to 99 mol% of 2-methyl-1,3-propanediol and 99 to 1 mol% of tetramethylene glycol as the glycol component. The glycol component should preferably be composed of 5 to 95 mol% of 2-methyl-1,3-propanediol and 95 to 5 mol% of tetramethylene glycol. If the content of 2-methyl-1,3-propanediol is less than 1 mol%, the resulting copolymer will not be improved in molding shrinkage and flexibility. On the other hand, if the content of 2-methyl-1,3-propanediol is near 100 mol%, the resulting copolymer tends to have a lower melting point, increases in transparency because of lowered crystallinity, and has deteriorated thermal and mechanical properties. Thus, the resulting copolymer has limited applications.

The polyester copolymer in this invention has irregularly distributed repeating units represented by the following formulas A and B, A being 1 to 99 mol% and B being 99 to 1 mol%.

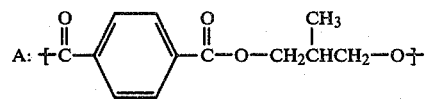

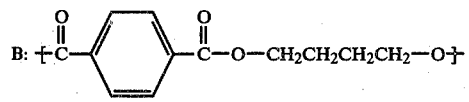

The best mode of the polyester according to the invention is a copolymer having an A component content of 0.1 to 25 percent by weight based on the whole weight of said polyester.

We have made further studies to obtain an improved polyester resin composed substantially of a PBT resin without the above discussed defects and found that when a poly-2-methyl-1,3-propylene terephthalate component consisting of terephthalic acid units and 2-methyl-1,3-propanediol units is incorporated in an appropriate amount into a PBT resin, the percent shrinkage is remarkably reduced and the flexibility is highly improved while the mechanical and electrical characteristics are maintained at practically useful levels. We have now completed the present invention based on this finding.

More specifically, in accordance with the present invention, there is provided a modified polyester resin composition comprising a polytetramethylene terephthalate resin composed of terephthalic acid and tetramethylene glycol and 0.1 to 25% by weight, based on the polyester resin, of a poly-2-methyl-1,3-propylene terephthalate component composed of terephthalic acid and 2-methyl-1,3-propanediol.

The above-mentioned polyester copolymer can be produced by the conventional processes for producing polyesters. That is, it can be produced by the process in which a dicarboxylic acid and a diol are polycondensed directly, or by the process in which a lower alkyl ester or halogen derivative of dicarboxylic acid is reacted with a diol.

The polycondensation process by so-called ester interchange which employs a lower alkyl ester of a carboxylic acid is exemplified as follows: Dimethyl terephthalate and an excess of mixed diols and tetramethylene glycol and 2-methyl-1,3-propanediol, the total thereof being 1.1 to 2.0 times the molarity of dimethyl terephthalate, are subjected to ester interchange reaction under a nitrogen stream at 150° to 240° C. under normal pressure, using a common esterification catalyst. During the reaction, methanol is distilled away. A catalyst and color protectant are added, as required. Polycondensation is performed at about 200° to 280° C. under a reduced pressure lower than 5 mmHg. The above-mentioned catalyst is exemplified by titanium compounds such as tetramethoxytitanium, tetraethoxytitanium, tetra-n-propoxytitanium, tetra-iso-propoxytitanium, and tetrabutoxytitanium; tin compounds such as di-n-butyltin dilaurate, di-n-butyltin oxide, and dibutyltin diacetate; acetates of magnesium, calcium, zinc, etc.; antimony oxide; and combinations thereof with said titanium compounds. These catalysts should preferably be used in an amount from 0.002 to 0.8 wt.% based on the total copolymer to be produced. Effective color protectants are phosphorus-containing compounds such as phosphorous acid, trimethyl phosphite, tridecyl phosphite, triphenyl phosphite, trimethyl phosphate, tridecyl phosphate and triphenyl phosphate. They should preferably be used in an amount from 0.001 to 0.3 wt.% based on the total copolymer produced. In addition to the color protectant, other additives such as a polymerization accelerator, brightening agent, and light stabilizer are added effectively.

The polyester copolymer in this invention is produced from terephthalic acid and 2-methyl-1,3-propanediol and tetramethylene glycol as the starting materials. It may contain as copolymer components polybasic aliphatic carboxylic acids such as adipic acid, azelaic acid, and sebacic acid; polybasic aromatic carboxylic acids such as isophthalic acid, trimellitic acid, pyromellitic acid, and 2,6-naphthalene-dicarboxylic acid; and polyhydric alcohols such as ethylene glycol, propylene glycol, neopentyl glycol, 1,6-hexanediol, 1,4-cyclohexanediol, cyclohexanedimethanol, trimethylolpropane, and pentaerythritol.

The modified polyester resin composition of the present invention can be obtained according to a known method by blending (1) a resin composition composed substantially of a PBT resin with (2) a resin composition composed substantially of a polyester formed by polymerizing terephthalic acid with 2-methyl-1,3-propanediol and/or (3) a resin composition composed substantially of a copolyester obtained by polymerizing terephthalic acid with tetramethylene glycol and 2-methyl-1,3-propanediol.

Blending can be accomplished by using customary methods and apparatus, for example, by a chemical method in which the polyesters are blended in the state of being dissolved in a solvent and by a mechanical method in which the polyesters are kneaded by a roll mixer, a Banbury mixer, an extruder or a molding machine.

The above-mentioned polyesters and copolyesters (1), (2) and (3) may be prepared in the same way as above mentioned in respect to the copolymer. The polyesters and copolyesters (1), (2) and (3) may include other monomers as mentioned above.

The poly-2-methyl-1,3-propylene terephthalate component composed of terephthalic acid and 2-methyl-1,3-propanediol, which is contained in the modified polyester resin composition of the present invention, is incorporated in an amount of 0.1 to 25% by weight, preferably 1 to 20% by weight, based on the polytetramethylene terephthalate component composed of terephthalic acid and tetramethylene glycol. If the amount of the poly-2-methyl-1,3-propylene terephthalate component is smaller than 0.1% by weight, substantial reduction of the molding shrinkage and substantial improvement of the flexibility cannot be expected. If the amount of the above component is larger than 25% by weight, the melting point and crystallinity of the resulting resin composition are extraordinarily lowered, and the thermal and mechanical strength characteristics are reduced to such an extent that the resin composition cannot practically be used.

The copolymer obtained according to the present invention is potentially useful in molding materials and adhesives.

The invention is illustrated by the following nonlimitative examples, in which "parts" means "parts by weight". The values given in the Tables were measured as follows:

(1) Content of Poly-2-methyl-1,3-propylene terephthalate

The content values shown in Tables 1 and 2 (% by weight) were determined by analysis of the NMR (nuclear magnetic resonance) spectrum of the obtained resin.

(2) Intrinsic Viscosity

The intrinsic viscosity is measured at 25° C. in o-chlorophenol.

(3) Melting point (softening point) and relative crystallinity

The thermal behavior was measured by a differential scanning calorimeter, Model DSC-1B, made by Perkin Elmer. The peak area due to melting is represented by a relative value, with the peak area of polytetramethylene terephthalate (Comparative Example in Table 1) being 100%. For non-crystalline resins, the softening point was measured by a micro-melting point measuring apparatus made by Yanagimoto Shoji Co., Ltd.

(4) Relative Crystallinity

The peak area observed when the resin is molten by the above-mentioned differential scanning calorimeter is measured, and a relative value of the peak value is calculated based on the supposition that the peak area of PBT (resin of Synthesis Example 1 in Table 1) is 100%.

(5) Percent Shrinkage

A predetermined amount of the resin is compression-molded at a temperature higher by 10° C. than the melting point thereof in a mold having a length of 150 mm, a width of 25 mm and a thickness of 7 mm, and the molded plate is allowed to stand still in a room maintained at a temperature of 23° C. and a relative humidity of 50% for 48 hours. The change of the length (% based on the original length) of the molded plate is determined.

(6) Bending Flexural Modulus

According to ASTM D-790, the bending flexural modulus was measured by using a Tensilon universal tester (Model UTM-III-500 supplied by Toyo Baldwine K.K.).

The poly-2-methyl-1,3-propylene terephthalate content is based on the total weight of the polyester resin.

EXAMPLE 1

Into a reactor equipped with agitator blades of the double helical ribbon type were charged 194.0 parts of dimethyl terephthalate, 121.5 parts of tetramethylene glycol, 13.5 parts of 2-methyl-1,3-propanediol, and 0.20 parts of titanium tetrabutoxide catalyst. The reactants were heated at 180° C. for 1 hour under normal pressure in a nitrogen stream and then heated at 230° C. for 2.5 hours to distill away 94% of the theoretical quantity of methanol. After adding 0.02 parts of trimethyl phosphate, the reaction products mixture was heated to 250° C. and the system was evacuated to 0.2 mmHg over 40 minutes, and the reaction was carried out under this condition for 3.5 hours.

EXAMPLE 2 AND COMPARATIVE EXAMPLE 1

Polymerization was carried out with the charging of starting materials as shown in Table 1 using the same procedures as in Example 1. Physical properties of the obtained polymers are shown in Table 1.

EXAMPLES 3 TO 6

Four kinds of polyester resins were prepared in the same way as in Example 1, except the proportions of starting materials were varied as shown in Table 2 for the purpose of preparation of the polymer blend according to the invention.

TABLE 1

| Items | Unit | Example 1 | Example 2 | Comparative Example 1 |
|---|---|---|---|---|
| Raw materials | | | | |
| Dimethyl terephthalate | Parts | 194.0 | 194.0 | 194.0 |
| Tetramethylene glycol | Parts | 121.5 | 87.7 | 135.0 |
| 2-Methyl-1,3-propanediol | Parts | 13.5 | 47.3 | — |
| Trimethyl phosphate | Parts | 0.02 | 0.02 | 0.02 |
| Tetrabutoxytitanium | Parts | 0.20 | 0.20 | 0.20 |
| Poly-2-methyl-1,3-propylene terephthalate | % | 12 | 47 | 0 |

TABLE 1-continued

| Items | Unit | Example 1 | Example 2 | Comparative Example 1 |
|---|---|---|---|---|
| component | | | | |
| Intrinsic viscosity | dl/g | 0.80 | 0.83 | 0.82 |
| Melting point | °C. | 213 | 141 | 229 |
| Relative crystallinity | % | 77 | 8 | 100 |

TABLE 2

| Items | Unit | Example No. 3 | 4 | 5 | 6 |
|---|---|---|---|---|---|
| Amounts Charged | | | | | |
| Dimethyl terephthalate | Parts | 194.0 | 194.0 | 194.0 | 194.0 |
| Tetramethylene glycol | " | 135.0 | 121.5 | 87.7 | — |
| 2-methyl-1,3-propanediol | " | — | 13.5 | 47.3 | 135.0 |
| Trimethyl phosphate | " | 0.02 | 0.02 | 0.02 | 0.02 |
| Tetrabutoxy titanium | " | 0.20 | 0.20 | 0.20 | 0.20 |
| Content of Poly-2-methyl-1,3-propylene Terephthalate | % | 0 | 12 | 47 | 100 |
| Intrinsic Viscosity | dl/g | 0.82 | 0.80 | 0.83 | 0.77 |
| Melting Point | °C. | 229 | 213 | 141 | 105* |
| Relative Crystallinity | % | 100 | 77 | 8 | 0 |

Note*: measured by a micro-melting point measuring apparatus supplied by Yanagimoto Shoji K.K.

The embodiments of the invention in which an exclusive property or privilege is claimed are defined as follows:

1. A polyester resin containing terephthalic acid units, 1,4-butanediol units and 2-methyl-1,3-propanediol units, said polyester resin containing from 0.1 percent by weight of said 2-methyl-1,3-propanediol units polymerized with said terephthalic acid units, based on the total weight of said polyester resin, up to 99 mol percent of said 2-methyl-1,3-propanediol units polymerized with said terephthalic acid units, based on the total weight of the diol units.

2. A polyester copolymer comprising terephthalic acid copolymerized with a diol component comprising 1 to 99 mol% of tetramethylene glycol and 99 to 1 mol % of 2-methyl-1,3-propanediol.

3. A polyester copolymer as claimed in claim 2 consisting essentially of terephthalic acid copolymerized with tetramethylene glycol and 2-methyl-1,3-propanediol, wherein the amount of said 2-methyl-1,3-propanediol is from 5 to 95 mol % of the sum of the amounts of said 2-methyl 1,3-propanediol and said tetramethylene glycol.

4. A polyester copolymer as claimed in claim 2, wherein said copolymer contains additional monomer units derived from compounds selected from the group consisting of polybasic aliphatic carboxylic acids, polybasic aromatic carboxylic acids, and polyhydric alcohols.

5. A polyester copolymer which consists essentially of (A) 0.1 to 25 percent by weight of first repeating units of the formula

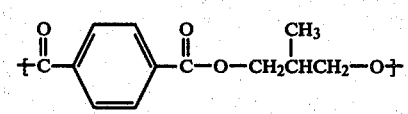

(B) the balance is second repeating units of the formula

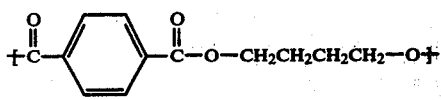

and

6. A polyester copolymer as claimed in claim 5, wherein said copolymer contains at least 12 wt. % of said first repeating units, based on the total weight of said copolymer.

7. A polyester resin composition which comprises a blend of a first resin which consists essentially of polytetramethylene terephthalate and a second resin which consists essentially of a member selected from the group consisting of (a) poly-2-methyl-1,3-propylene terephthalate resin, (b) a copolyester obtained by copolymerizing terephthalic acid with 2-methyl-1,3-propanediol and tetramethylene glycol, and (c) mixtures of (a) and (b), said blend containing from 0.1 to 25 percent by weight, of 2-methyl-1,3-propylene terephthalate units.

8. A polyester resin composition as claimed in claim 7, wherein said second resin is (a).

9. A polyester resin composition as claimed in claim 7, wherein said polyester resin composition contains additional monomer units derived from compounds selected from the group consisting of polybasic aliphatic carboxylic acids, polybasic aromatic carboxylic acids, and polyhydric alcohols.

* * * * *

REEXAMINATION CERTIFICATE (518th)
United States Patent [19]
Toga et al.

[11] B1 4,381,379

[45] Certificate Issued Jun. 10, 1986

[54] POLYESTER CONTAINING 2-METHYL-1,3-PROPYLENE TEREPHTHALATE UNITS

[75] Inventors: Yuzo Toga; Toshio Shimada; Hajime Komada, all of Himeji, Japan

[73] Assignee: Daicel Chemical Industries, Ltd., Osaka, Japan

Reexamination Request:
No. 90/000,790, May 28, 1985

Reexamination Certificate for:
Patent No.: 4,381,379
Issued: Apr. 26, 1983
Appl. No.: 360,493
Filed: Mar. 22, 1982

[30] Foreign Application Priority Data

Mar. 25, 1981 [JP] Japan .................................. 56-44286
Apr. 15, 1981 [JP] Japan .................................. 56-56766

[51] Int. Cl.⁴ .................. C08F 283/02; C08G 63/76
[52] U.S. Cl. .............................. 525/444; 525/437; 525/445; 528/272; 528/302; 528/303; 528/308.7
[58] Field of Search ............ 525/444, 437, 445; 528/272, 302, 303, 308.7

[56] References Cited

U.S. PATENT DOCUMENTS 4,267,286  5/1981  Campbell .......................... 525/176

*Primary Examiner*—Lucille M. Phynes

[57] ABSTRACT

Polytetramethyleneterephthalate is modified with incorporation of 2-methyl-1,3-propanediol. The diol component of the polyester comprises 1 to 99 mol % of tetramethylene glycol and 99 to 1 mol % of 2-methyl-1,3-propanediol. Alternatively polytetramethylene terephthalate is combined with 0.1 to 25 wt. %, based thereon, of poly-2-methyl-1,3-propylene terephthalate.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–6 is confirmed.

Claim 7 is determined to be patentable as amended.

Claims 8 and 9, dependent on an amended claim, are determined to be patentable.

7. A polyester resin composition which comprises a blend of a first resin which consists essentially of polytetramethylene terephthalate and a second resin which consists essentially of a member selected from the group consisting of (a) [poly-2-methyl-1,3-propylene terephthalate resin, (b)] a copolyester obtained by copolymerizing terephthalic acid with 2-methyl-1,3-propanediol and tetramethylene glycol, and [(c)] *(b)* mixtures of (a) [and (b)], *and poly-2-methyl-1,3-propylene terephthalate resin,* said blend containing from 0.1 to 25 percent by weight, of 2-methyl-1,3-propylene terephthalate units.

* * * * *